April 24, 1956     W. A. REICH     2,743,028
APPARATUS FOR SHIFTING LOADS CARRIED BY OVERHEAD TRACKS
Filed Oct. 11, 1954     2 Sheets-Sheet 2
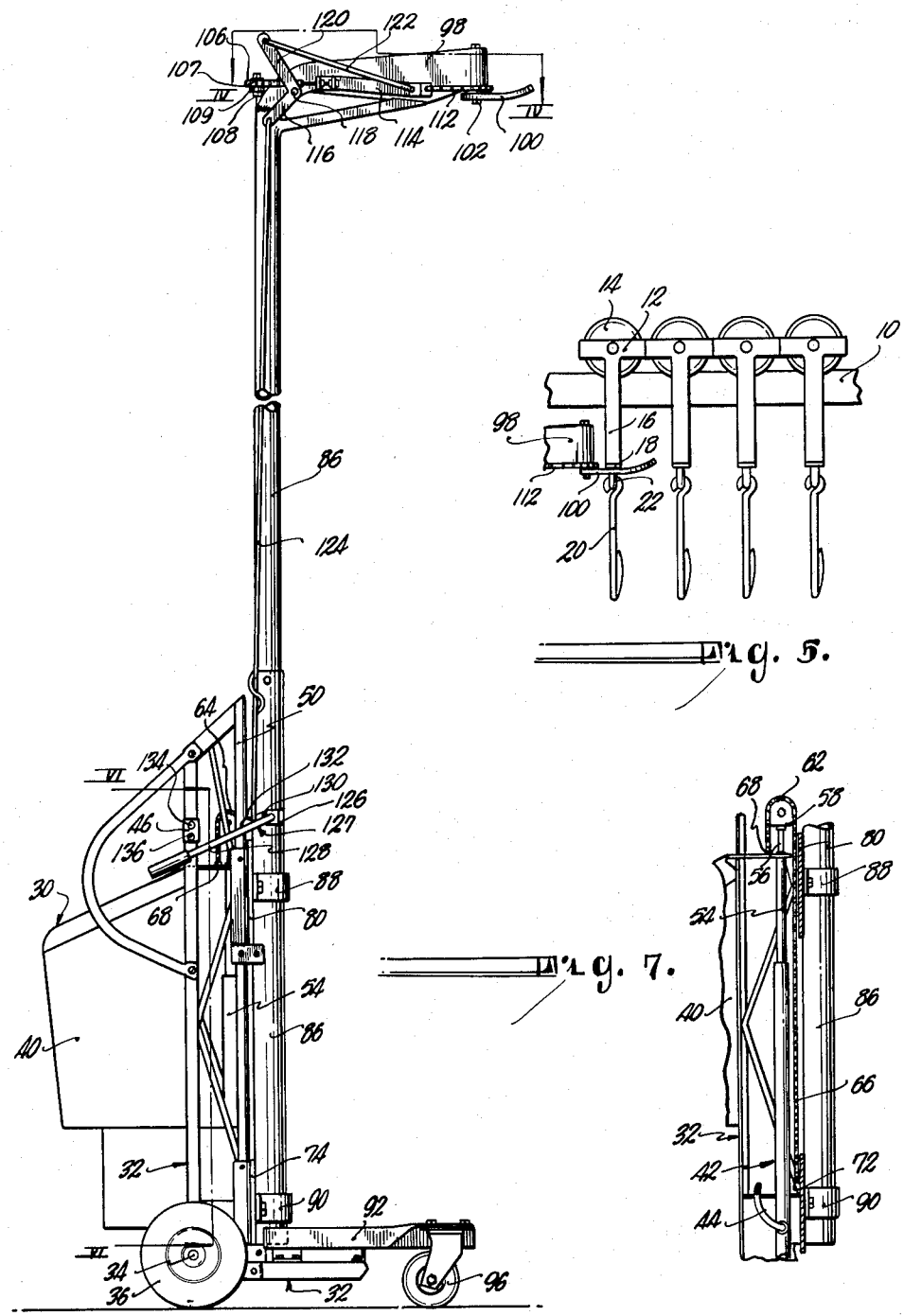
INVENTOR.
Walter A. Reich
BY
ATTORNEY.

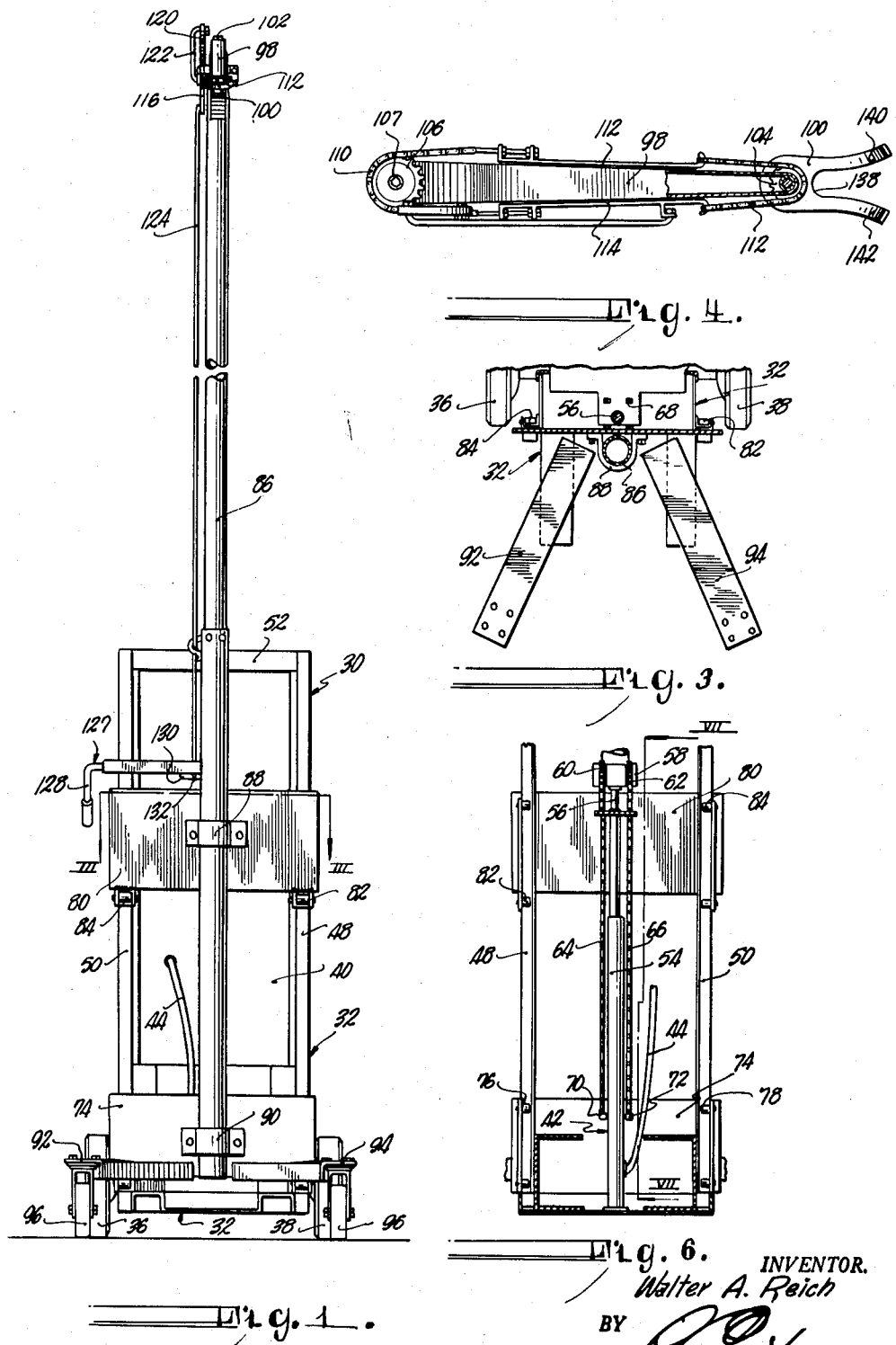

United States Patent Office 2,743,028
Patented Apr. 24, 1956

2,743,028
APPARATUS FOR SHIFTING LOADS CARRIED BY OVERHEAD TRACKS

Walter A. Reich, Kansas City, Mo., assignor to A. Reich & Sons, Inc., Kansas City, Mo., a corporation of Missouri Application October 11, 1954, Serial No. 461,544

3 Claims. (Cl. 214—730)

This invention relates to the field of loading, hoisting and shifting apparatus and, more particularly, to mobile apparatus of such general class adapted for removing trolleys such as are commonly used in meat packing plants and banana handling warehouses from one overhead track rail and then shifting the load and emplacing same upon a different overhead track rail.

It is the most important object of this invention to provide mobile load handling apparatus having structure for releasably holding a load mounted for lateral swinging movement upon a vertically reciprocable boom, whereby such mast may be reciprocated and such structure swung to a position for engaging a trolley upon a overhead track, the trolley may be lifted from the track by upward reciprocation of the mast, and the trolley may be laterally displaced from the track by controlled swinging of said structure. It is obviously also an important object of the invention to provide such structure adapted for performance of the mentioned steps in reverse order in connection with the emplacement of a trolley removed from one track upon another.

Other important objects of the invention, including important details of construction will be made clear or become apparent as the following specification progresses, reference being had to the accompanying drawings, wherein:

Figure 1 is a front elevational view of the load handling apparatus of this invention;

Fig. 2 is a side elevational view of said apparatus;

Fig. 3 is a fragmentary cross sectional view taken on line III—III of Fig. 1;

Fig. 4 is a view, partially in top plan and partially in section of the structure associated with the upper portion of the vertical mast of the apparatus taken on line IV—IV of Fig. 2;

Fig. 5 is a fragmentary side elevational view of a typical overhead track having trolleys thereon and showing a portion of the apparatus of this invention in position ready for removal of a trolley from the track;

Fig. 6 is a fragmentary cross sectional view taken on line VI—VI of Fig. 2; and

Fig. 7 is a fragmentary cross sectional view taken on line VII—VII of Fig. 6.

In the cooling rooms of meat packing plants, for example, it has heretofore been the procedure in moving a side of beef or the like suspended from a trolley upon an overhead track to another overhead track for workmen to manually lift the load and trolley from the one track and emplace the same upon the other track. Such procedure not only requires the expenditure of unneeded labor but also increases the risk of dropping of the load which, in the case of many food stuffs, may either be permanently damaged or require recleaning and processing. The present invention obviates the necessity for such manual handling of heavy loads suspended from trolleys on overhead tracks by providing mechanical apparatus which may be operated by a single workman and employed to more positively and quickly move a trolley and its suspended load from one overhead track to another without danger of droppage or injury to workmen.

Referring first to Fig. 5, there is designated by the numeral 10 a typical overhead track rail such as are used in many plants, warehouses and the like, a plurality of mobile trolleys 12 each having a peripherally grooved wheel 14 riding upon the rail 10 are shown in place on the latter. Each trolley 12 has an elongated bracket 16 depending therefrom and provided at its lowermost extremity with a lateral flange 18 from which is suspended a load receiving hook 20. Hook 20 is attached to flange 18 by means of an eye 22.

Referring now also to the other figures the apparatus of this invention is generally designated by the numeral 30 and includes a mobile frame 32 provided with an axle 34 carrying a pair of ground engaging wheels 36 and 38, and with a housing 40 wherein is provided a battery operated hydraulic pump (not shown) for supplying hydraulic fluid to a hydraulic cylinder assembly generally designated 42 through a hydraulic line 44. An electric switch 46 is conventionally provided on frame 32 for controlling tthe operation of the pump means (not shown) for the hydraulic cylinder assembly 42.

Frame 32 includes a pair of upright, parallel track members 48 and 50 which are braced at their upper end by a cross piece 52.

Hydraulic assembly 42 includes a cylinder 54 having a piston (not shown) therein to which is attached a vertically reciprocable piston rod 56 carrying a perpendicular shaft element 58 upon which are rotatably mounted a pair of sprockets 60 and 62. A pair of chains 64 and 66 are attached at one end thereof to the housing 40 as at 68 and thence extend over sprockets 60 and 62 respectively to a point of connection at their lower ends (as at 70 and 72 respectively) with a plate 74 mounted for vertical reciprocation along track members 48 and 50 by rollers 76 and 78 respectively.

So much of the apparatus 30 as has thus far been described is entirely conventional in character and may be obtained upon the market, a unit fitting such description being currently manufactured and sold by Big Joe Manufacturing Company of Chicago, Illinois.

In accordance with this invention, a second vertically reciprocable plate 80 is provided on tracks 48 and 50 being mounted on the latter by means of rollers 82 and 84 respectively. An elongated upright mast 86 is secured to plates 80 and 74 by any suitable means such as clamping brackets 88 and 90 respectively. By virtue of the interconnection of each of plates 80 and 74 with mast 86, it will be clear that both of such plates 80 and 74 reciprocate together when the hydraulic assembly 42 is actuated to reciprocate piston rod 56 upwardly thereby raising the lower end 70 and 72 of chains 60 and 62 respectively which are attached to plate 74 as by welding.

A pair of forwardly extending outriggers 92 and 94 are mounted on the front of frame 32 and each provided with a depending, pivotally mounted caster wheel mechanism 96 adjacent their forwardmost extremity to give stability to the apparatus 30.

Vertical mast 86 is provided with a lateral extension 98 extending forwardly from the top of mast 86 and having a substantially V-shaped fork 100 pivotally mounted at the forwardmost extremity of such extension 98 by a bolt or the like 102, the legs 140 and 142 of fork 100 being arched slightly upwardly at their free ends. Pivot bolt or pin 102 is vertical so that fork 100 is free to swing laterally in either direction from extension 98 about the vertical axis of the pivot element 102. It is also noted that pivot element 102 is so formed and so mounted in extension 98 as to maintain fork 100 in the same horizontal plane relative to extension 98.

Also rotatably mounted upon pivot bolt 102 is a sprocket 104 having rigid interconnection with fork 100. An idler sprocket 106 is rotatably mounted upon a bolt 108 extending upwardly from mast 86 adjacent the zone of juncture of the latter with extension 98. A washer 107 overlies and a rubber washer 109 underlies sprocket 106 on bolt 108, the latter being held against sprocket 106 by a nut 111, so that sprocket 106 is frictionally braked between washers 107 and 109 to prevent undesired rotation. A length of chain 110 is trained about idler sprocket 106 and has its ends respectively connected with a pair of elongated links 112 and 114 which are disposed on opposite sides of extension 98. The opposite ends of links 112 and 114 are connected with the ends of a second length of chain 112 which is trained about sprocket 104. It will, therefore, be clear that as reciprocable movement along the length thereof is imparted to link 114, for instance, chains 110 and 112 will be moved with the latter rotating sprocket 104 to thereby swing fork 100 in a corresponding direction laterally of the longitudinal axis of elongated extension 98.

In order to impart such controlled movement to link 114, and thereby fork 100, there is provided a crank 116 pivotally mounted on one side of extension 98 as at 118. One leg 120 of crank 116 is interconnected with link 114 by means of a rod 122, the remaining leg of crank 116 in turn having an elongated vertical rod 124 connected therewith, all of such connections of rods 122 and 124 with crank 116 and link 114 obviously being pivotal in nature. Intermediate the ends of mast 86 at a level within convenient reach of an operator is provided a bracket 126 mounted on mast 86 in which is pivotally mounted a substantially U-shaped crank lever generally designated 127, having its bight within bracket 126, its longer arm 128 extending rearwardly for use as an operating handle and its opposite arm 130, which is shorter than arm 128, pivotally interconnected with the lower end of rod 124 as at 132.

It will now be apparent that as handle arm 128 of crank lever 127 is moved upwardly, for instance, rod 124 will be vertically reciprocated to move leg 120 of crank 116 forwardly, thereby reciprocating rod 122 forwardly to move link 114 in the same direction. Forward movement of link 114 will move chain 112 to rotate sprocket 104 in a counter-clockwise direction as viewed in Fig. 4, thereby swinging fork 100 laterally from the longitudinal axis of extension 98 in one direction. Obviously, downward movement of the handle arm 128 of crank lever 127 will result in rearward reciprocation of link 114, and accordingly, swinging of the fork 100 in the opposite direction.

Referring again to Fig. 5, the operational procedure for use of the load handling apparatus 30 will manifestly be substantially as follows: The operator will move apparatus 30 by means of its ground engaging wheels 36, 38 and 96 into a position disposing the forward extremity of extension 98 generally adjacent the position of one of the trolleys 12. By means of a raising button 134 or a lowering button 136 conventionally included as a part of switch 46 the operator will activate hydraulic assembly 42 to raise or lower mast 86 to a reciprocated position disposing the fork 100 on a horizontal plane even with the eye 22 of the trolley 12 desired to be raised and immediately below the level of the flange 18 of the latter. By operation of the crank lever 127 the operator will then swing fork 100 to a position for receiving the eye 22 of the trolley 12 below the flange 18 of the latter. If necessary, the whole apparatus 30 may then be moved slightly to assure that the eye 22 of the trolley 12 is at the vertex 138 of the fork 100 between its opposed legs 140 and 142. With fork 100 in such position underlying the flange 18 of the trolley to be moved, switch means 46 is then operated to further reciprocate the mast 86 upwardly a short distance sufficient to assure that the peripheral groove of the wheel 14 of trolley 12 has vertically cleared the track rail 10. Crank lever 127 is then again operated to swing fork 100 carrying trolley 12 therewith laterally out of the vertical plane of the track rail 10. The whole apparatus may then be moved to a point of delivery of the load upon hook 20 of the trolley 12 and, if it is desired to emplace the trolley 12 upon another track rail (not shown) or upon the same track rail 10 at a different position, the procedure just outlined for removal of the trolley from rail 12 may be reversed to accomplish the desired emplacement, as will be obvious to those skilled in the art. It may be significant to note that the weight of the load upon hook 20 maintains flange 18 securely engaged upon the upper face of fork 100 during movement of the trolley 12 by apparatus 30.

It will now be clear that this invention provides simple, inexpensive and fool proof means for overcoming the problems and attaining the objectives hereinbefore mentioned. It will also be obvious that changes and modifications could be made in certain of the details of construction disclosed for purposes of illustration without departing from the true spirit and intentions of the invention. Accordingly, it is to be understood that this invention shall be deemed limited only by the scope of the appended claims.

Having thus described the invention, what is claimed as new and desired to be secured by Letters Patent is:

1. Apparatus for handling load carrying trolleys used with overhead tracks, said apparatus comprising a mobile frame; an elongated, vertically reciprocable, upright mast on the frame; mechanism on the frame for reciprocating the mast in either direction; means on the frame for controlling operation of the mechanism; structure adapted for releasably holding one of said trolleys; an elongated, lateral extension on the top of the mast; means pivotally mounting the structure on the extension adjacent the end of the latter remote from the mast for swinging movement of the structure about a vertical axis; linkage operably coupled with the structure for swinging the latter; and means on the mast adjacent the frame for controlling operation of the linkage.

2. In the apparatus as set forth in claim 1, wherein said linkage includes a crank lever on the mast intermediate the ends of the latter, a crank on the extension adjacent the mast, a rod interconnecting the lever with the crank, a sprocket rigid to said structure and pivoted therewith, a chain engaging said sprocket, and parts interconnecting the crank with the chain.

3. Apparatus for handling load carrying trolleys used with overhead tracks, said apparatus comprising a mobile frame provided with a pair of upright rails; a plate mounted on the rails for vertical reciprocation along the latter; hydraulic cylinder means on the frame having a vertically reciprocable piston rod provided with a sprocket wheel thereon; a chain passing over the wheel and attached at its respective ends to the frame and the plate; mechanism on the frame for operating the hydraulic cylinder means to reciprocate the piston rod in either direction; an elongated, upright mast mounted on the plate and extending above the frame; an elongated, lateral extension on the mast adjacent the upper end of the latter; a V-shaped fork pivotally mounted adjacent its vertex on the extension at the end of the latter remote from the mast for swinging movement laterally of the extension upon a vertical axis; a sprocket rigid to the fork and pivoted therewith; a chain element engaging the sprocket; a lever pivotally mounted on the mast adjacent the frame; a crank pivotally mounted on the extension adjacent the mast; means interconnecting the lever and the crank; and means interconnecting the crank and the element.

References Cited in the file of this patent

UNITED STATES PATENTS

| | | |
|---|---|---|
| 1,051,780 | Terril et al. | Jan. 28, 1913 |
| 2,517,085 | Cirillo | Aug. 1, 1950 |
| 2,621,821 | Melin | Dec. 16, 1952 |